US008594994B1

(12) United States Patent
Dean

(10) Patent No.: US 8,594,994 B1
(45) Date of Patent: Nov. 26, 2013

(54) CROSS-LINGUAL INDEXING AND INFORMATION RETRIEVAL

(75) Inventor: Jeffrey A. Dean, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 13/323,034

(22) Filed: Dec. 12, 2011

Related U.S. Application Data

(63) Continuation of application No. 10/647,053, filed on Aug. 21, 2003, now Pat. No. 8,135,575.

(51) Int. Cl.
*G06F 17/28* (2006.01)
*G06F 17/20* (2006.01)
*G06F 17/30* (2006.01)

(52) U.S. Cl.
USPC ............... 704/7; 704/2; 704/3; 704/4; 704/5; 704/8; 715/256; 715/264; 707/705; 707/706; 707/708; 707/709; 707/760

(58) Field of Classification Search
USPC ........ 704/2, 4, 5, 8, 6, 7, 9, 10; 707/705, 706, 707/708
See application file for complete search history.

(56) References Cited

U.S. PATENT DOCUMENTS

| | | | | |
|---|---|---|---|---|
| 5,510,981 | A * | 4/1996 | Berger et al. | ...................... 704/2 |
| 5,920,859 | A | 7/1999 | Li | |
| 6,006,221 | A | 12/1999 | Liddy et al. | |
| 6,070,176 | A | 5/2000 | Downs et al. | |
| 6,321,189 | B1 | 11/2001 | Masuichi et al. | |
| 6,349,276 | B1 | 2/2002 | McCariey | |
| 6,360,196 | B1 * | 3/2002 | Poznanski et al. | ................. 704/8 |
| 6,381,598 | B1 | 4/2002 | Williamowski et al. | |
| 6,385,568 | B1 | 5/2002 | Brandon et al. | |
| 6,418,403 | B2 | 7/2002 | Fuji | |
| 6,523,000 | B1 | 2/2003 | Ando et al. | |
| 6,571,241 | B1 * | 5/2003 | Nosohara | .............................. 1/1 |
| 6,604,101 | B1 | 8/2003 | Chan et al. | |
| 6,647,364 | B1 | 11/2003 | Yumura et al. | |
| 6,952,691 | B2 | 10/2005 | Drissi et al. | |
| 7,020,601 | B1 * | 3/2006 | Hummel et al. | .................. 704/2 |
| 7,146,358 | B1 | 12/2006 | Gravano et al. | |
| 7,149,681 | B2 | 12/2006 | Hu et al. | |
| 2001/0012992 | A1 | 8/2001 | Kimpara et al. | |
| 2002/0013693 | A1 | 1/2002 | Fuji | |

(Continued)

OTHER PUBLICATIONS

1997. Logos machine translation system. In Proceedings of the Fifth Conference on Applied Natural Language Processing: Descriptions of System Demonstrations and Videos (Washington, DC, Mar. 31-Apr. 3, 1997). Applied Natural Language Conferences. Morgan Kaufmann Publishers, San Francisco, CA, 17-17.

(Continued)

*Primary Examiner* — Paras D Shah
(74) *Attorney, Agent, or Firm* — Fish & Richardson P.C.

(57) ABSTRACT

Systems and methods are disclosed for searching across multi-lingual information. A user makes a query in a first language, and a group of documents that were previously machine-translated into the first language are searched for information responsive to the query. Contextual information derived can be used to improve the accuracy of the machine translation. Responsive documents are returned to the user. Alternatively, a query provided in a user's language may be translated into one or more other languages. Documents written in these languages can then be searched for information responsive to the appropriate translated query. Responsive documents can be translated into the user's language prior to providing them to the user.

21 Claims, 5 Drawing Sheets

(56) References Cited

U.S. PATENT DOCUMENTS

| | | | |
|---|---|---|---|
| 2002/0111967 | A1 | 8/2002 | Nagase |
| 2002/0169770 | A1 | 11/2002 | Kim et al. |
| 2002/0193983 | A1 | 12/2002 | Tokieda et al. |
| 2003/0208482 | A1* | 11/2003 | Kim et al. .......................... 707/3 |
| 2004/0006560 | A1* | 1/2004 | Chan et al. ........................ 707/3 |

OTHER PUBLICATIONS

2002. Bablefish Machine Translation Program: Frequently Asked Question. AltaVista Search Company. http:/tweb.archive.org/web/20011217215320/help.altavista.com/babelfish/babel_faq.

Buitelaar, et al. Integrating Different Strategies for Cross-Language Information Retrieval in the MIETTA Project, 1998.

Capstick et al., 2000. A system for supporting crosslingual information retrieval. Inf. Process. Manage. 36, 2 (Jan. 2000), 275-289. DOI=http://dx.doi.org/10.1016/S03064573(99)00058-8.

Hull et al., 1996. Querying across languages: a dictionary-based approach to multilingual information retrieval. In Proceedings of the 19th Annual international ACM SIGIR Conference on Research and Development in information Retrieval (Zurich, Switzerland, Aug. 18-22, 1996). SIGIR '96. ACM, New York, NY, 49-57.

Kraaij et al., 2003. Embedding web-based statistical translation models in cross-language information retrieval. Comput. Linguist. 29, 3 (Sep. 2003), 381-419. DOI= http://dx.doi.org/10.1162/089120103322711587.

Lu et al., 2002. Translation of web queries using anchor text mining. ACM Transactions on Asian Language Information Processing (TALIP) 1, 2 (Jun. 2002), 159-172. DOI=http://doi.acm.org/10.1145/568954.568958.

Lu et al., "LiveTrans: Translation Suggestion for Cross-Language Web Search from Web Anchor Texts and Search Results." Proceedings of Research on Computational Linguistics Conference XV (ROCLING), 57-72, 2003.

Nie et al., 2002. "Exploiting the Web as Parallel Corpora for Cross-Language Information Retrieval." Web Intelligence, pp. 218-239.

Oard et al., Document Translation for Cross-Language Text Retrieval at the University of Maryland, presented at the *Sixth Text Retrieval Conference (TREC-6)*, Nov. 1997.

Oard, A Comparative Study of Query and Document Translation for Cross-Language Information Retrieval, presented at the Third Conference of the Association for Machine Translation in the Americas (AMTA), Oct. 1998.

Resnik, P. (1998). Parallel strands: A preliminary investigation into mining the web for bilingual text. In Third Conference of the Association for Machine Translation in the Americas, pp. 1-11.

\* cited by examiner

CROSS-LINGUAL INDEXING AND INFORMATION RETRIEVAL

CROSS-REFERENCE TO RELATED APPLICATIONS

This application is a continuation application of and claims priority to U.S. application Ser. No. 10/647,053, for Cross-Lingual Indexing and Information Retrieval filed on Aug. 21, 2003. The disclosure of the foregoing application is incorporated herein by reference.

BACKGROUND OF THE INVENTION

1. Field of the Invention

The present invention relates generally to information search and retrieval.

More specifically, systems and methods are disclosed for searching across multi-lingual information.

2. Description of Related Art

In an information retrieval system, a user typically enters a query in a particular language and receives results selected from a corpus of documents that are written in the same language as the query. Potentially responsive documents written in other languages are ignored.

Systems and methods are needed for searching across multi-lingual information using queries provided in any of a variety of languages.

SUMMARY OF THE INVENTION

Systems and methods are disclosed for searching across multi-lingual information. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments are described below.

In one embodiment, a method for cross-lingual information searching is provided. In accordance with this method, a user makes a query in a first language, and a group of documents that were previously machine-translated into the first language are searched for information responsive to the query. Responsive documents are then returned to the user.

In another embodiment, a user provides a query in a first language, and, in response, a group of documents are at least partially translated into the first language and searched for responsive information. Responsive documents are then fully translated into the first language and returned to the user.

In yet another embodiment, a computer program package is provided which includes instructions that can cause a computer to search a corpus of documents for information responsive to a user's query, and return responsive documents (and/or a list of responsive documents) to the user. The corpus consists of documents that have been translated into each of a group of languages, and the documents that are searched in response to the user's query are those that are written in, or have been translated into, the language in which the user provided his or her query.

In yet another embodiment, a query provided in a user's language is translated into a second language. A set of documents written in the second language are then searched for information responsive to the translated query. Documents responsive to the translated query can then be returned to the user. In some embodiments, the responsive documents are translated into the user's language prior to providing them to the user.

In another embodiment, a system for cross-lingual information retrieval is provided. The system includes a database containing a group of documents, each document having been translated into multiple languages. The system further includes query processing logic operable to receive a query in a given language and to search the documents in the database that are written in the given language for information responsive to the query. The system may also include a translation and indexing engine for automatically translating a document into multiple languages and adding it to the database.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Figure 1:
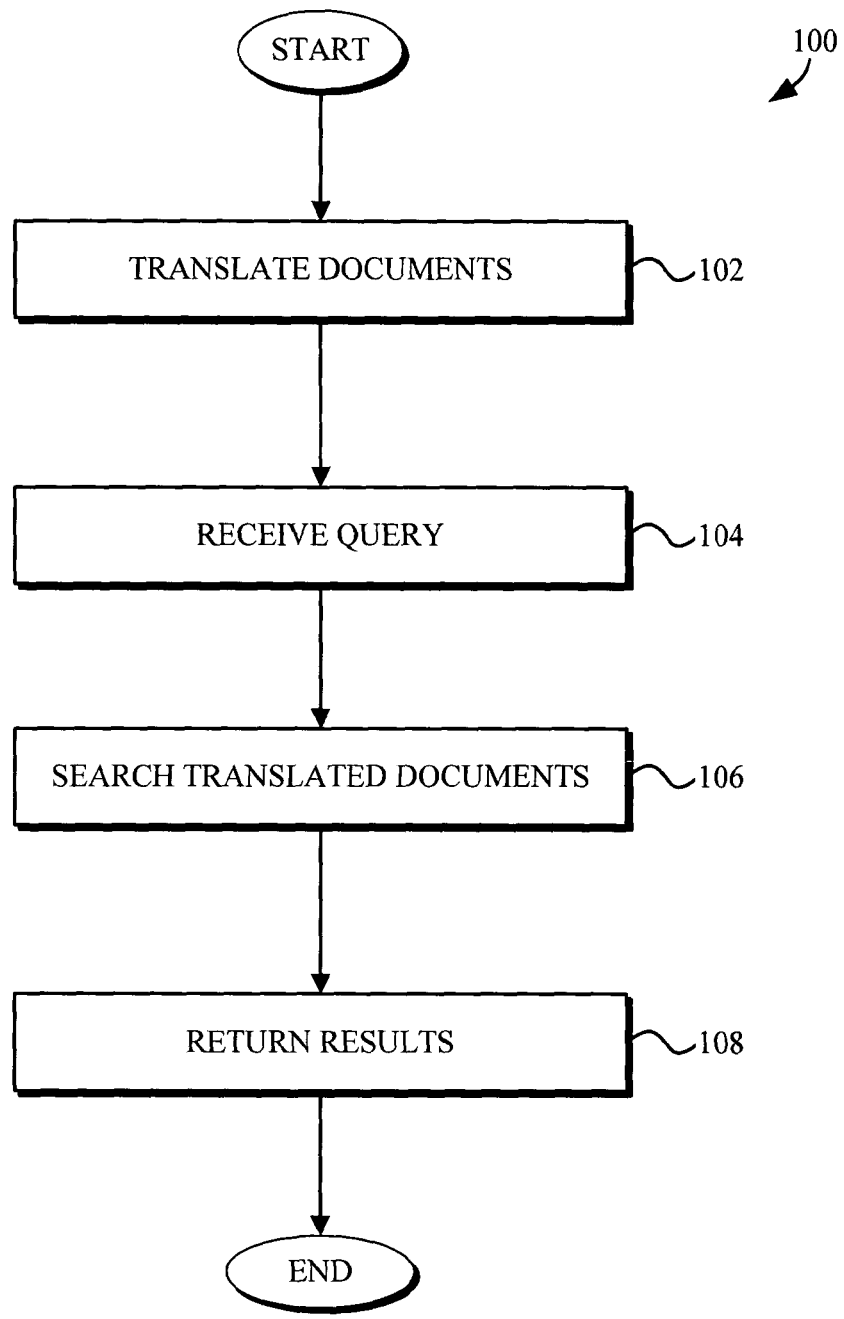
FIG. 1 is a flowchart illustrating a method for searching and retrieving multi-lingual information.

Systems and methods are disclosed for searching across multi-lingual information. The following description is presented to enable any person skilled in the art to make and use the inventive body of work. Descriptions of specific embodiments and applications are provided only as examples and various modifications will be readily apparent to those skilled in the art. For example, although many of the examples are described using Internet web pages as the documents to be translated and/or searched, it is to be understood that offline documents, e.g., books, newspapers, magazines or other paper documents that have been scanned in, may also be translated and/or searched. The general principles defined herein may be applied to other embodiments and applications without departing from the spirit and scope of the invention. Thus, the present invention is to be accorded the widest scope, encompassing numerous alternatives, modifications, and equivalents consistent with the principles and features disclosed herein. For purpose of clarity, details relating to technical material that is known in the fields related to the invention have not been described in detail so as not to unnecessarily obscure the present invention.

In an information retrieval system, users typically enter queries via a retrieval interface to find responsive documents in a base corpus. The queries are generally entered in a particular language, and the matches that are returned are restricted to those documents that match the query in some way. For example, boolean logic can be used, or a term frequency-inverse document frequency (tf-idf) based information retrieval score could be used, with the words in the query combined with the words in each document.

Systems and methods are provided where for queries Q in some language L, documents in languages other than L are considered and ranked in addition to documents in language L. In a preferred embodiment, an automatic machine translation system is used that is capable of translating a document D from its native language L_source into a set of other languages {L_targets}. Examples of such machine translation systems include, without limitation, AltaVista's Babelfish system and Systran's language translation products, which are rule-based systems for translating documents from one language to another, as well as systems such as Candide, from IBM Research, which are based on statistical machine translation techniques. It should be appreciated, however, that any suitable translation system could be used.

In one embodiment, many or all of the documents D in a base corpus are translated into a plurality of other versions, representing a set of translations of the contents of D into other languages {D_target1, D_target2, ... D_targetN}. To facilitate cross-lingual information retrieval, a document indexing system indexes some suitable portion (e.g., full text, related anchor text, partial abstract, etc.) of each of these translated versions. The appropriate version of the translated documents is then searched in response to a query, as well as the native version of documents in the query language. This permits any of the documents in the corpus to be retrieved, regardless of their language or the language of the query.

FIG. 1 is a flowchart illustrating an embodiment of the foregoing technique 100 for searching and retrieving multilingual information. As shown in FIG. 1, a group of documents is translated into a set of one or more languages at step 102. For example, the documents may be Internet web pages and each document may be translated into the languages for which the system designer desires to provide search capabilities. Offline document web pages generally refer to offline documents that may be served as web pages, e.g., books that have been scanned into digital searchable (and translatable) format. In a preferred embodiment, a context-specific translation model is used, in which the context depends on, e.g., the text of all the pages on the web site, the text of pages that link to the page in question, the text of pages that link from the page in question, and/or some other suitable context. Each link may be either a direct link or an indirect link through at least one other web page, i.e., a chain of links. The translated documents can then be indexed or otherwise organized using conventional techniques to facilitate rapid search and retrieval. In a preferred embodiment, the anchor-text that points to a given web page is also translated and indexed, since anchor text will often provide helpful summaries or characterizations of the document to which it points, thereby increasing the likelihood that relevant information will be located in response to a query.

Referring once again to FIG. 1, upon receiving a query in a particular language at step 104, the translated documents corresponding to that language, as well as any documents that were originally in that language, are evaluated for responsiveness at step 106. The responsive documents (and/or a list of responsive documents) are then returned to the user at step 108. In some embodiments, the returned documents (and/or list of documents) include an indication of each document's native language.

Although FIG. 1 shows the group of documents being translated before a query is received, it should be appreciated that in other embodiments some or all of the documents could be translated after a query is received, although such an approach may result in relatively slow response times. Alternatively, or in addition, only a portion of each document could be translated at step 102, with that portion being used to perform the search shown at step 106. In such an embodiment, a full translation could then be provided for any responsive documents, and/or for responsive documents that were specifically selected by the user.

Figure 2:
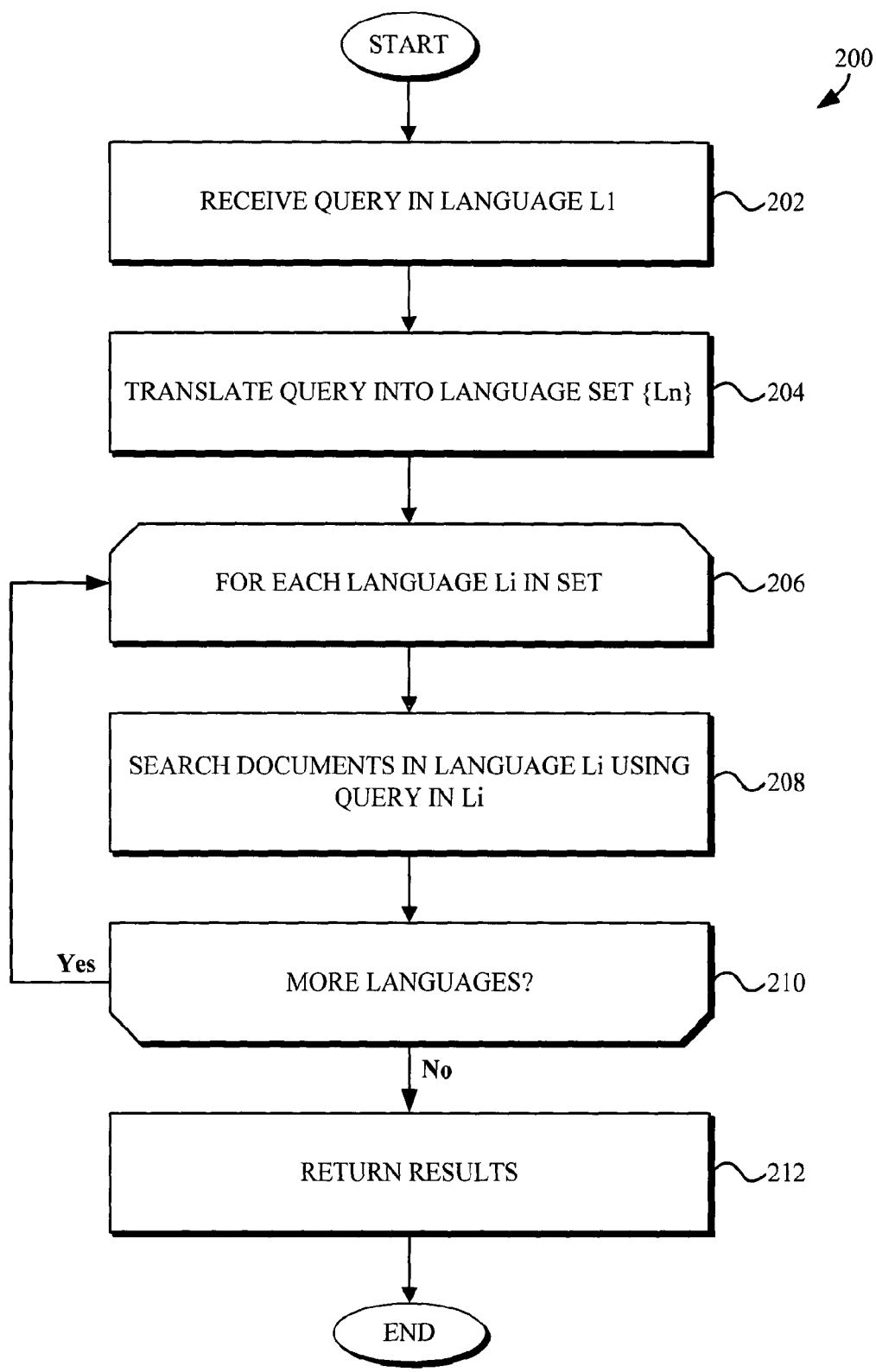
FIG. 2 is a flowchart illustrating another method for searching and retrieving multi-lingual information.

An alternative approach to that illustrated in FIG. 1 is to translate the queries into one or more languages using automatic translation software, and to use the translated queries to search documents in each of the translated query languages. The results can then be merged together to form the result set for the given query, and/or summaries or abstracts can be excerpted from translated versions of the responsive documents such that the document summaries match the original language of the query. FIG. 2 illustrates such a method 200.

Referring to FIG. 2, upon receiving a query in a language $L_1$ at step 202, the query is translated into multiple languages $\{L_2 \ldots L_N\}$ at step 204. For each language $L_i$ in the set, the corresponding query is used to search all documents that are written in that language at steps 206, 208, 210. Once the documents in each language group have been searched using the appropriate query, the results are returned to the user at step 212, at which point any responsive documents (or suitable portions thereof) can be translated into, e.g., the language of the original query.

An approach such as that illustrated in FIG. 2 has the advantage of requiring less storage for the documents and the index, and less computation at document indexing time, than the approach shown in FIG. 1. However, such a system will generally entail more computation at query processing time, and may be somewhat less effective, since translation systems are typically more accurate when given larger pieces of text with which to work, since larger pieces of text typically provide more contextual information from which to decide among ambiguous translation alternatives. For example, a machine translation system will generally be much more accurate when used to translate a large body of text, such as an entire document, than it will be when used to translate a two or three word query string. Therefore, a system that translates documents (and/or related anchor text), and indexes the translated contents, is likely to be more accurate than a system that attempts to translate queries alone at query serving time. However, it should be appreciated that either or both approaches could be used in accordance with the present invention.

Figure 3:
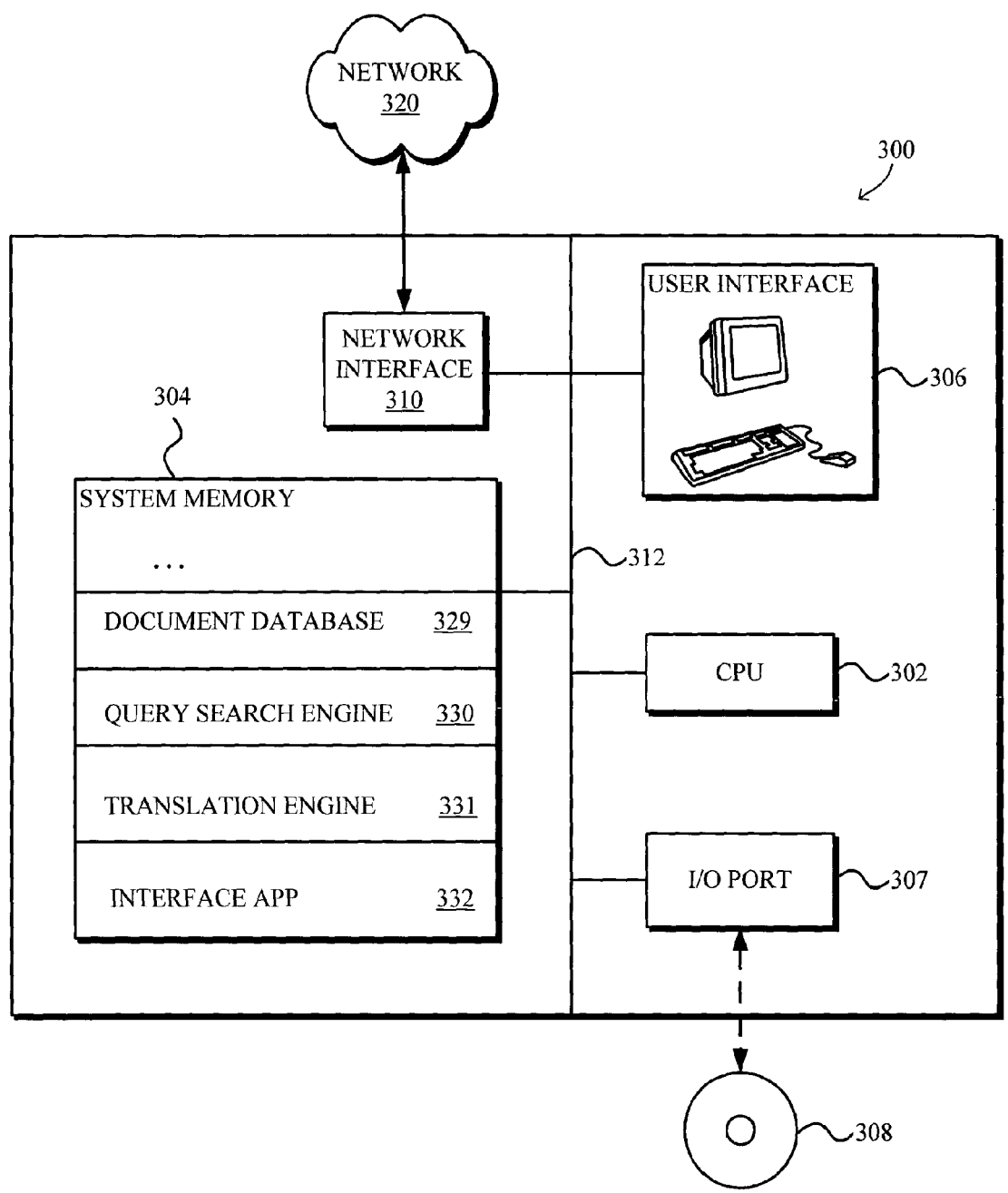
FIG. 3 is a block diagram of an illustrative system for facilitating the search and retrieval of multi-lingual information.

FIG. 3 is a block diagram illustrating an example system 300 for performing cross-lingual search and retrieval. In one embodiment, system 300 comprises a general-purpose computing device such as a personal computer or a network server. System 300 will typically include a processor 302, computer readable media (memory) 304, a user interface 306, an input/output port 307 for accepting removable storage media 308, a network interface 310, and a bus 312 for connecting the aforementioned elements. The operation of system 300 will typically be controlled by processor 302 operating under the guidance of programs stored in memory 304. Memory 304 will generally include both high-speed random-access memory (RAM) and non-volatile memory such as a magnetic disk, disk array, and/or tape array. Port 307 may comprise a disk drive or memory slot for accepting computer-readable media such as floppy diskettes, CD-ROMs, DVDs, memory cards, magnetic tapes, or other media. Network interface 310 is typically operable to provide a connection between system 300 and other systems (and/or networks) via a network 320 such as the Internet or an intranet (e.g., a LAN, WAN, VPN, etc.).

As shown in FIG. 3, memory 304 may include a variety of programs or modules for controlling the operation of system 300 and performing the techniques described above in connection with FIG. 1 and/or FIG. 2. For example, memory 304 may include a database of documents 329, possibly indexed and translated into multiple languages. Memory 304 may also include a search engine 330 for searching the database 329 using a query received from user interface 306 and/or remotely from a user over network 320. As shown in FIG. 3, memory 304 may also include a language translation engine 331 for translating documents and/or queries into one or more languages, and a user-interface application 332 for operating user interface 306 and/or serving user interface web pages to remote users over network 320.

One of ordinary skill in the art will appreciate that the systems and methods of the present invention can be practiced with devices and/or architectures that lack some of the components shown in FIG. 3 and/or that have other components that are not shown. Thus, it should be appreciated that FIG. 3 is provided for purposes of illustration and not limitation as to the scope of the invention. For example, it should be appreciated that while, for purposes of illustration, system 300 is depicted as a single, general-purpose computing device such as a personal computer or a network server, in other embodiments system 300 could comprise one or more such systems operating together using distributed computing techniques. In such embodiments, some or all of the components and functionality depicted in FIG. 3 could be spread amongst multiple systems at multiple locations and/or operated by multiple parties. For example, translation engine 331 could be implemented on a system that is separate from the system on which document database 329 is hosted. In such an embodiment, if it were desired to add a new document to database 329, the document could be sent over network 320 to the system that hosts translation engine 331. The translated version(s) of the document would then be returned for indexing and entry into database 329. It will be readily apparent to one of ordinary skill in the art that many similar variations could be made to the illustration shown in FIG. 3 without departing from the principles of the present invention.

As indicated above, in a preferred embodiment a context-specific translation model is used. For example, when translating a given web page, the context can depend on the text of all of the other pages on the site, on surrounding pages that link to the page in question, and/or on some other suitable context. By increasing the contextual information that is used to translate a web page, the accuracy of the translation is likely to increase, resulting in increased search accuracy.

Figure 4:
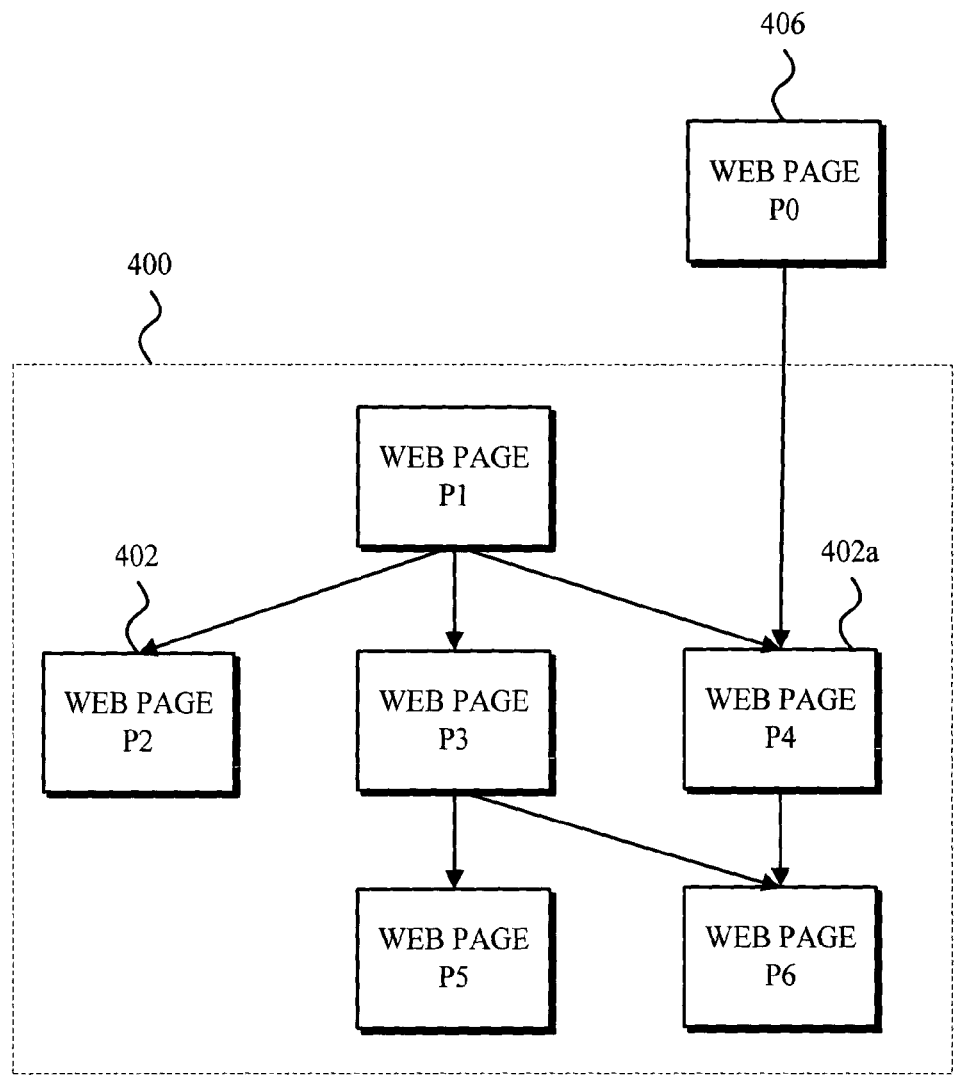
FIG. 4 illustrates the use of a context-specific translation model in the translation of a web page.

FIG. 4 illustrates how such a context-specific translation model could be used in the translation of web pages 402 from a web site 400. As shown in FIG. 4, web pages 402 are interconnected using hyperlinks 404, as is well known in the art. If, for example, a given web page 402a is to be translated by an automatic translation system in order to facilitate multi-lingual information retrieval, the automatic translation system could obtain increased contextual information about the web page by examining the other web pages contained on the web site 400, since it will often be the case that the web pages on a given site will share a common subject matter, grammar, and/or syntax. Alternatively, a subset of the web pages on the site could be used—such as all the web pages that directly link to the web page under consideration, all the web pages to which the given web page links, and/or some other suitable grouping—and/or contextual information could be derived from web pages 406 that link to the web page in question from other sites. It should be appreciated that in other embodiments, other contextual information could be used. For example, contextual information could also (or alternatively) be gleaned from the anchor text that links to a given web page, metatags, headers, and/or other information, whether visible to a user or embedded in mark-up language.

Multi-lingual contextual information can be particularly valuable in improving the accuracy of machine translation. For example, if the web pages that point to the web page under consideration are written in the target language, they can be used to provide examples of the usage patterns and subject matter most appropriate for inclusion in the translation. For example, hidden Markov models such as those often used in the context of speech recognition systems can be generated from such a corpus of text in the target language (e.g., multi-lingual documents that link to the web page that is to be translated), and then used to check the accuracy of a machine translation, and/or used to choose between different possible translations, since word combinations that appear with greater frequency in the corpus of native, target-language documents are generally more likely to represent accurate translations than word combinations that do not.

Figure 5:
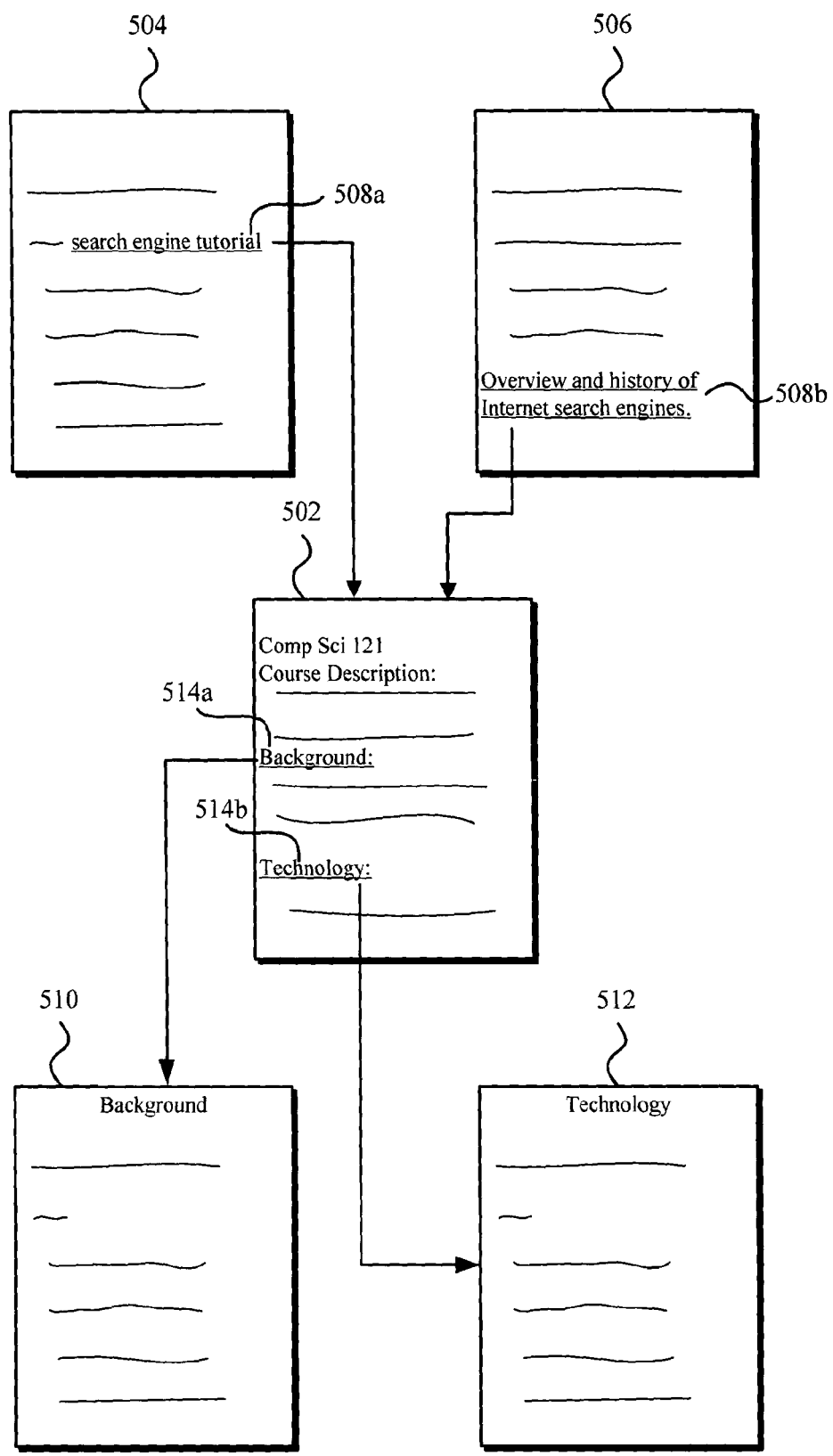
FIG. 5 illustrates the use of anchor-text to improve the accuracy of multi-lingual search and retrieval.

As previously indicated, in a preferred embodiment some or all of the anchor-text that links to a given document (such as a web page) is translated and indexed along with the document itself. FIG. 5 illustrates such a technique. Referring to FIG. 5, a web page 502 is referenced by two other web pages 504 and 506. Anchor text 508a, 508b in web pages 504 and 506 links to, and provides a short description of, web page 502. The web page 502 in turn references two other web pages 510 and 512 via anchor text 514a, 514b. Anchor text 514a, 514b in web page 502 links to, and provides a short description of, web pages 510 and 512. In the hypertext markup language (HTML), anchor text comprises the text that corresponds to a hyperlink between web pages (or locations on a given web page). For example, the HTML command: "<A href="http://www. abc_university.edu/classes/cs121.html">search engine tutorial</A>" causes the text "search engine tutorial" to be displayed as a hyperlink pointing to the web page found at http://www.abc_university.edu/classes/cs121.html. Anchor text will often provide a more accurate description of a web page than the page itself, and thus can be particularly useful in determining the nature of the web page to which it points. In the context of multi-lingual translation, the anchor text can be particularly helpful if it is in a different language than the page to which it points (e.g., the query language). To the extent the anchor text needs to be translated, the web page to which the anchor text points (and/or the web page in which the anchor text is located) can be used to provide contextual clues to help in the translation.

While preferred embodiments are described and illustrated herein, it will be appreciated that they are merely illustrative, and that modifications can be made to these embodiments without departing from the spirit and scope of the invention. Thus, the invention is intended to be defined only in terms of the following claims.

What is claimed is:

1. A method implemented by one or more computers, the method comprising:
translating anchor text of a collection of documents to a target language using a context-specific translation model, wherein one or more of the documents in the collection of documents include anchor text for links that point to one or more documents outside of the collection of documents, wherein the one or more documents outside the collection of documents are in the target language, and wherein anchor text in the one or more of the documents in the collection of documents is translated by the context-specific translation model using, at least in part, the one or more documents outside of the collection of documents that are linked to the respective anchor text;

indexing the translated anchor text to create one or more anchor text indexes;

indexing the one or more of the documents outside of the collection of documents that are in the target language to create one or more document indexes; and providing the anchor text indexes and the document indexes for use in responding to queries.

2. The method of claim 1, further comprising:
obtaining a new document to be indexed;
translating the new document into the target language; and
indexing the translated document in one or more of the document indexes.

3. The method of claim 1, further comprising:
obtaining a new document to be indexed;
translating anchor text of the new document to the target language; and
indexing the translated anchor text of the new document in one or more of the anchor text indexes.

4. The method of claim 1, further comprising:
receiving a query in a first language;
translating the query into the target language to form a first translated query;
identifying one or more documents that are responsive to the first translated query using the anchor text indexes and document indexes; and
providing a response to the first translated query based on the identified documents.

5. The method of claim 4 wherein identifying one or more documents that are responsive to the first translated query using the anchor text indexes and document indexes and providing a response to the first translated query based on the identified documents comprises:
identifying anchor text in the target language that is responsive to the first translated query, wherein the anchor text links to one or more documents that are in the target language; and
providing the one or more documents that are in the target language in response to the first translated query.

6. The method of claim 4 wherein providing a response to the first translated query comprises:
determining that an identified document containing information responsive to the first translated query is not written in the first language; and
in response to the determination, translating the given document to the first language.

7. The method of claim 1 wherein the documents in the collection of documents include web pages and offline documents.

8. A system comprising:
one or more computers programmed to perform operations comprising:
translating anchor text of a collection of documents to a target language using a context-specific translation model, wherein one or more of the documents in the collection of documents include anchor text for links that point to one or more documents outside of the collection of documents, wherein the one or more documents outside the collection of documents are in the target language, and wherein anchor text in the one or more of the documents in the collection of documents is translated by the context-specific translation model using, at least in part, the one or more documents outside of the collection of documents that are linked to the respective anchor text;

indexing the translated anchor text to create one or more anchor text indexes;

indexing the one or more of the documents outside of the collection of documents that are in the target language to create one or more document indexes; and providing the anchor text indexes and the document indexes for use in responding to queries.

9. The system of claim 8 wherein the operations further comprise:
obtaining a new document to be indexed;
translating the new document into the target language; and
indexing the translated document in one or more of the document indexes.

10. The system of claim 8 wherein the operations further comprise:
obtaining a new document to be indexed;
translating anchor text of the new document to the target language; and
indexing the translated anchor text of the new document in one or more of the anchor text indexes.

11. The system of claim 8 wherein the operations further comprise:
receiving a query in a first language;
translating the query into the target language to form a first translated query;
identifying one or more documents that are responsive to the first translated query using the anchor text indexes and document indexes; and
providing a response to the first translated query based on the identified documents.

12. The system of claim 11 wherein identifying one or more documents that are responsive to the first translated query using the anchor text indexes and document indexes and providing a response to the first translated query based on the identified documents comprises:
identifying anchor text in the target language that is responsive to the first translated query, wherein the anchor text links to one or more documents that are in the target language; and
providing the one or more documents that are in the target language in response to the first translated query.

13. The system of claim 11 wherein providing a response to the first translated query comprises:
determining that an identified document containing information responsive to the first translated query is not written in the first language; and
in response to the determination, translating the given document to the first language.

14. The system of claim 8 wherein the documents in the collection of documents include web pages and offline documents.

15. A non-transitory computer readable media encoded with instructions that are operable, when executed by a computer, to cause the computer to perform operations comprising:
translating anchor text of a collection of documents to a target language using a context-specific translation model, wherein one or more of the documents in the collection of documents include anchor text for links that point to one or more documents outside of the collection of documents, wherein the one or more documents outside the collection of documents are in the target language, and wherein anchor text in the one or more of the documents in the collection of documents is translated by the context-specific translation model using, at least in part, the one or more documents outside of the collection of documents that are linked to the respective anchor text;

indexing the translated anchor text to create one or more anchor text indexes;

indexing the one or more of the documents outside of the collection of documents that are in the target language to create one or more document indexes; and providing the anchor text indexes and the document indexes for use in responding to queries.

16. The computer readable media of claim 15 wherein the operations further comprise:

obtaining a new document to be indexed;

translating the new document into the target language; and indexing the translated document in one or more of the document indexes.

17. The computer readable media of claim 15 wherein the operations further comprise:

obtaining a new document to be indexed;

translating anchor text of the new document to the target language; and indexing the translated anchor text of the new document in one or more of the anchor text indexes.

18. The computer readable media of claim 15 wherein the operations further comprise:

receiving a query in a first language;

translating the query into the target language to form a first translated query;

identifying one or more documents that are responsive to the first translated query using the anchor text indexes and document indexes; and providing a response to the first translated query based on the identified documents.

19. The computer readable media of claim 18, wherein identifying one or more documents that are responsive to the first translated query using the anchor text indexes and document indexes and providing a response to the first translated query based on the identified documents comprises:

identifying anchor text in the target language that is responsive to the first translated query, wherein the anchor text links to one or more documents that are in the target language; and providing the one or more documents that are in the target language in response to the first translated query.

20. The computer readable media of claim 18, wherein providing a response to the first translated query comprises:

determining that an identified document containing information responsive to the first translated query is not written in the first language; and in response to the determination, translating the given document to the first language.

21. The computer readable media of claim 15, wherein the documents in the collection of documents include web pages and offline documents.

* * * * *